United States Patent
Bu et al.

(10) Patent No.: US 11,905,812 B2
(45) Date of Patent: Feb. 20, 2024

(54) INTRA-LAYER REINFORCEMENT METHOD, AND CONSOLIDATION AND RECONSTRUCTION SIMULATION EXPERIMENT SYSTEM AND EVALUATION METHOD FOR GAS HYDRATE FORMATION

(71) Applicant: CHINA UNIVERSITY OF PETROLEUM (EAST CHINA), Qingdao (CN)

(72) Inventors: Yuhuan Bu, Qingdao (CN); Huajie Liu, Qingdao (CN); Dong Lin, Qingdao (CN); Shenglai Guo, Qingdao (CN); Chang Lu, Qingdao (CN); Xinyang Guo, Qingdao (CN); Rui Ma, Qingdao (CN); Qiang Wang, Qingdao (CN); Changyou Xiang, Qingdao (CN); Meihua Huo, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 17/727,691

(22) Filed: Apr. 22, 2022

(65) Prior Publication Data
US 2023/0063437 A1 Mar. 2, 2023

(30) Foreign Application Priority Data

Aug. 24, 2021 (CN) .......................... 202110972005.0
Dec. 20, 2021 (CN) .......................... 202111558924.X (51) Int. Cl.
*E21B 43/267* (2006.01)
*E21B 33/13* (2006.01)

(52) U.S. Cl.
CPC ............ *E21B 43/267* (2013.01); *E21B 33/13* (2013.01); *E21B 2200/20* (2020.05); *G01N 2203/0246* (2013.01)

(58) Field of Classification Search
CPC .... E21B 43/267; E21B 33/13; E21B 2200/20; G01N 2203/0246
(Continued)

(56) References Cited

U.S. PATENT DOCUMENTS 7,963,328 B2 * 6/2011 Khinkis ................ E21B 43/243
  166/57
10,815,778 B1 * 10/2020 Hou ........................ G06F 17/11
(Continued)

OTHER PUBLICATIONS

Wu et al. (Experimental simulations and methods for natural gas hydrate analysis in China, China Geology 1 (2018) 61-71) (Year: 2018).*
(Continued)

*Primary Examiner* — Iftekhar A Khan
(74) *Attorney, Agent, or Firm* — Bayramoglu Law Offices LLC (57) ABSTRACT

An intra-layer reinforcement method, and a consolidation and reconstruction simulation experiment system and an evaluation method for a gas hydrate formation are provided. In the intra-layer reinforcement method, the formation reconstruction and fracturing grouting reinforcement technologies are combined; a fracturing grouting process is adopted to create fractures in the gas hydrate formation; and a consolidation liquid enters the fractures and penetrates into the formation through a pressure difference to form a reinforcement with a ribbed slab structure and a specified strength and permeability, which supports the formation to achieve collapse prevention and sand prevention. A specific consolidation and reconstruction simulation experiment system is adopted, where the necessary conditions for the (Continued)

generation and decomposition of a hydrate are tested, and the fracturing, formation consolidation, and cementing experiments are simulated to study a rational exploitation method of a gas hydrate, thereby solving the problem of sand production of the hydrate layer.

13 Claims, 7 Drawing Sheets

(58) Field of Classification Search
USPC .......................................................... 703/10
See application file for complete search history.

(56) References Cited

U.S. PATENT DOCUMENTS

| | | | |
|---|---|---|---|
| 2004/0060438 A1* | 4/2004 | Lyon | C07C 7/00 95/153 |
| 2008/0319674 A1* | 12/2008 | Dai | G01V 1/30 702/14 |
| 2010/0006287 A1* | 1/2010 | Schicks | E21B 43/295 166/272.1 |
| 2011/0290488 A1* | 12/2011 | Boone | E21B 43/16 166/300 |
| 2015/0205004 A1* | 7/2015 | Li | G01V 99/005 703/10 |
| 2016/0251943 A1* | 9/2016 | Li | B01J 12/02 422/162 |
| 2018/0171732 A1* | 6/2018 | Li | E21B 21/067 |
| 2018/0298274 A1* | 10/2018 | Zhao | C09K 8/588 |
| 2021/0002444 A1* | 1/2021 | Dwarakanath | C09K 8/602 |
| 2021/0404296 A1* | 12/2021 | Li | G01N 15/082 |
| 2022/0228464 A1* | 7/2022 | Li | G01N 33/24 |
| 2022/0228474 A1* | 7/2022 | Li | G01P 5/001 |
| 2022/0235632 A1* | 7/2022 | Li | E21B 47/07 |
| 2022/0235646 A1* | 7/2022 | Li | E21B 34/06 |
| 2022/0298892 A1* | 9/2022 | Li | E21B 43/35 |
| 2022/0301457 A1* | 9/2022 | Li | G09B 23/40 |

OTHER PUBLICATIONS

Guo et al. (Evolution on the Gas Production from Low Permeability Gas Hydrate Reservoirs by Depressurization Combined with Reservoir Stimulation, 2020, ACS Publications, pp. 15819-15828) (Year: 2020).*

* cited by examiner

INTRA-LAYER REINFORCEMENT METHOD, AND CONSOLIDATION AND RECONSTRUCTION SIMULATION EXPERIMENT SYSTEM AND EVALUATION METHOD FOR GAS HYDRATE FORMATION

CROSS REFERENCE TO THE RELATED APPLICATIONS

This application is based upon and claims priority to Chinese Patent Application No. 202110972005.0, filed on Aug. 24, 2021, and Chinese Patent Application No. 202111558924.X, filed on Dec. 20, 2021, the entire contents of which are incorporated herein by reference.

TECHNICAL FIELD

The present disclosure belongs to the field of intra-layer reinforcement of gas hydrate formations, and particularly relates to an intra-layer reinforcement method, and a consolidation and reconstruction simulation experiment system and an evaluation method for a gas hydrate formation.

BACKGROUND

Gas hydrates are an energy source with extremely high potential, and have received extensive attention from many countries worldwide. With the continuous emergence of a large number of research results, a breakthrough has been made in the development of hydrates. Hydrates are exploited by various methods, including a depressurization method, a heat injection method, a chemical agent method, and a $CO_2$—$CH_4$ exchange method, where the depressurization method is widely used and effective in hydrate exploitation. However, the complex characteristics of gas hydrate reservoirs and the exploitation environment of deep-water shallow layers bring many troublesome problems to be solved in an exploitation and development process, especially a series of safety problems easily caused by the decomposition of hydrates during a depressurization exploitation process. These safety problems are mainly as follows: (1) A solid hydrate that plays the role of cementation or support is decomposed into a flowing gas-liquid mixed fluid, which reduces a mechanical bearing capacity of a formation; and water generated by the decomposition penetrates into the formation, which increases a water content of a wellbore formation and weakens the connection among particles, thereby causing wellbore instability. (2) A mechanical strength of the formation is reduced and a formation pore pressure is increased, which greatly reduces a concretion strength of a sediment in a hydrate formation. Under the action of external forces such as an earthquake or a load increase, submarine landslides may occur. (3) When a reservoir structure is damaged, sand particles are peeled off from skeleton sand and become loose. With the development of an oil reservoir, a formation fluid begins to flow and produces a drag force on sand particles, resulting in sand production.

At present, there are few studies related to gas hydrate formation reconstruction, and most of the research directions are to form fractures with high flow conductivity around a wellbore through fracturing, thereby effectively improving the production capacity of hydrate reservoirs. However, research related to hydrate formation reinforcement is still at an exploration stage. In relevant research inside and outside of China, only the preliminary research is conducted on deformation and damage of the formation during a hydrate exploitation process by means of numerical simulation, but there is no effective method for reinforcement and collapse prevention of a hydrate formation, and there is also no simulation experiment system and evaluation method for consolidation and reconstruction of hydrate formation.

SUMMARY

The present disclosure is intended to provide an intra-layer reinforcement method, and a consolidation and reconstruction simulation experiment system and an evaluation method for a gas hydrate formation.

Hydraulic fracturing refers to generating fracturing fractures or expanding natural fractures in a formation by injecting a fracturing liquid into the formation, which improves the permeability and the heat and mass transfer efficiency to achieve the purpose of stimulation. The hydraulic fracturing technology has been relatively perfect in conventional oil and gas reservoir formations. For gas hydrate formations, a sediment is mainly composed of silt and clay that are weakly cemented or uncemented, which increases the difficulty of hydraulic fracturing. However, hydrates exist in the form of a cement near particle contact points, or exist in the form of a pore filling material in a sediment, which greatly improves the cementation characteristics of a hydrate layer and is conducive to the operation of hydraulic fracturing. On the basis of fracturing, a consolidation liquid is injected into formation fractures, and a specified pumping pressure is maintained to prevent the closure of the fractures and the extrusion of the consolidation liquid. Moreover, the consolidation liquid stays in the fractures and is solidified to form a reinforcement with a ribbed slab structure and a specified strength. The reinforcement shows prominent cementing performance to the surrounding formation, and after the hydrate is decomposed, the formation can be effectively supported, thereby achieving both collapse prevention and sand prevention. Based on the above ideas, the present disclosure provides the theory of "intra-layer reinforcement, collapse prevention, and sand prevention of a gas hydrate formation".

In the present disclosure, fracturing fractures generated by gas hydrate fracturing and the surrounding formation are taken as research areas, and a series of reinforcements are formed in the hydrate formation by means of fracturing grouting. Moreover, when penetrating into the formation, the consolidation liquid shows well cementing performance to the hydrate formation, which improves the consolidation effect, effectively avoids formation collapse, sand production, and other problems caused by hydrate decomposition, provides an innovative solution for improving the stability of gas hydrate formations, and provides an important guarantee for the safety and efficient development of gas hydrates.

The method for intra-layer reinforcement of a gas hydrate formation in the present disclosure includes the following steps:

(1) collecting a gas hydrate formation sample or determining temperature and pressure environmental parameters of a target formation based on existing field data;

(2) analyzing physical parameters of the target formation, and using a consolidation particle material with prominent mechanical properties and a suitable particle size to determine a structure of a simulated formation according to the physical parameters and an occurrence mode of the target formation; controlling a hydrate saturation by means of quantified water and excess gas, and monitoring the hydrate stability based on the temperature and pressure conditions of the target formation; under the temperature and pressure conditions of the target formation, maintaining the simulated formation; and testing physical parameters of the simulated formation, comparing the physical parameters of the simulated formation with the physical parameters of the target formation, and adjusting experimental design parameters until the physical parameters of the simulated formation are the same as or similar to the physical parameters of the target formation;

(3) allowing a consolidation liquid system to be applied and solidified in the simulated formation by means of fracturing to form a reinforcement for the intra-layer reinforcement, where the reinforcement has reasonable permeability and strength; and (4) according to a required reinforcement range of the target formation and reinforcement characteristics, regulating a fracturing grouting construction process until formation consolidation requirements are met, which includes: grouting pipe string fracturing parameters and consolidation liquid injection parameters.

The physical parameters in step (2) may include, but are not limited to, density, porosity, permeability, particle size distribution, hydrate saturation, and original formation strength.

Further, the consolidation liquid may have prominent permeability characteristics, and can penetrate into the formation through the fractures at a specified depth; the consolidation liquid should be suitable for the temperature and pressure conditions of the gas hydrate formation, and may have a small consistency before being pumped into the formation to ensure its flow characteristics during a construction process; and a solidified reinforcement may show prominent cementing properties to the target formation, and reasonable permeability characteristics and strength properties.

Further, the injection parameters may include an injection pressure difference and an injection flow rate; the grouting pipe string fracturing parameters may include a fracturing shape and shape parameters thereof; and the reinforcement characteristics may include a depth and a cross-sectional shape of a reinforcement, the number of reinforcements, and a strength of a reinforcement itself.

Further, the intra-layer reinforcement of the hydrate formation may be achieved by a formation fracturing method, and fracturing parameters may be determined according to the physical parameters and mechanical parameters of the hydrate formation; and a laboratory simulation may be implemented and monitored by using a consolidation and reconstruction simulation experiment system of a weakly-cemented hydrate layer.

Further, during a wait-on-cement (WOC) process of the consolidation liquid system to form a reinforcement, it is necessary to maintain a pumping pressure for a specified time under the target formation temperature condition to prevent the closure of fractures and the extrusion of the consolidation liquid; a value of the pumping pressure may be determined according to the injection pressure difference; and the time for which the pumping pressure is maintained may be determined according to WOC characteristics of the consolidation liquid.

The present disclosure also provides a consolidation and reconstruction simulation experiment system of a gas hydrate formation, where the necessary conditions for the generation and decomposition of a hydrate are tested by a method of laboratory condition simulation, and the cementing and fracturing experiments are simulated to study a rational exploitation method of a gas hydrate, which fundamentally solves the cementing quality problem in deepwater weakly-cemented formations.

The present disclosure provides a consolidation and reconstruction simulation experiment system for a gas hydrate formation, including:

a consolidation slurry pumping module, where the consolidation slurry pumping module includes a hydrate model; the hydrate model includes a cavity body, a plurality of fluid interfaces are formed on the cavity body, and a plurality of measurement points are further arranged on the cavity body; and a pre-embedded pipe assembly is connected in the cavity body, an end of the pre-embedded pipe assembly is arranged in the cavity body, and the pre-embedded pipe assembly includes a pre-embedded pipe, a casing pipe, and a central oil pipe from outside to inside; and an end of the pre-embedded pipe assembly protrudes into the cavity body, and the pre-embedded pipe assembly includes a lifting liquid injection port, a consolidation liquid injection port, and a fracturing liquid injection port; and the lifting liquid injection port, the consolidation liquid injection port, and the fracturing liquid injection port communicate with a lifting pump, a consolidation pump, and a fracturing pump, respectively;

a hydrate annular core making module, where the hydrate annular core making module includes a gas injection part and a liquid injection part; the gas injection part includes a high-pressure gas storage tank; one end of the high-pressure gas storage tank communicates with a gas cylinder through a gas booster pump, and the other end of the high-pressure gas storage tank communicates with the fluid interfaces through a gas pressure-reducing valve and a gas mass flow controller; and the liquid injection part includes a constant-speed and constant-pressure pump, and a liquid communicates with the fluid interfaces through the constant-speed and constant-pressure pump;

a hydrate generation and decomposition real-time monitoring module, where the hydrate generation and decomposition real-time monitoring module includes an outlet separation measurement part and a test part; and the outlet separation measurement part communicates with the hydrate model, and the test part communicates with the measurement points; and an evacuation part for vacuuming, where the evacuation part communicates with the hydrate model.

Preferably, the casing pipe may be arranged in the pre-embedded pipe, and a lifting channel may be formed on a pipe wall of the casing pipe; one end of the lifting channel may penetrate through the pipe wall of the casing pipe to form a lifting liquid space with a top of the pre-embedded pipe, and the lifting liquid injection port may be formed at the other end of the lifting channel;

the central oil pipe may be arranged in the casing pipe, and a consolidation channel may be formed in the central oil pipe; one end of the consolidation channel may be arranged in the cavity body, and a one-way valve may be arranged inside the consolidation channel; the other end of the consolidation channel may penetrate through the cavity body, and the consolidation liquid injection port may be formed on the end;

a fracturing channel may be formed between the central oil pipe and the casing pipe; one end of the fracturing channel may be arranged in the cavity body and may be connected to a sealing member, and a plurality of perforations may be formed on an end of the casing pipe close to the sealing member; and the other end of the fracturing channel may penetrate through the cavity body, and the fracturing liquid injection port may be formed on the end.

Preferably, a film for sealing may be provided outside the perforations, and the sealing member may be a packer.

Preferably, the cavity body may be further fixedly connected to an external pipe, and the external pipe may be arranged outside the pre-embedded pipe; and the external pipe may be slidably connected to the pre-embedded pipe, and a vent may be formed at a side of the external pipe.

Preferably, the cavity body may communicate with a gas pressure-reducing valve for controlling a gas pressure; the cavity body may communicate with a constant-speed and constant-pressure pump for controlling a liquid pressure; and the cavity body may further communicate with a water bath for controlling a temperature.

Preferably, the cavity body may be further connected to a plurality of resistance measurement layers, each resistance measurement layer may include a plurality of resistance measurement points, and each resistance measurement layer may be arranged annularly inside the cavity body; a resistance test line interface communicating with the resistance measurement points may be formed on the cavity body; and the cavity body may be further connected to a plurality of ultrasonic probes, and the ultrasonic probes may protrude into the cavity body at different depths.

Preferably, the measurement points may include a plurality of pressure measurement layers and a plurality of temperature measurement layers, and each pressure measurement layer and each temperature measurement layer may respectively include a plurality of pressure measurement points and a plurality of temperature measurement points.

Preferably, the outlet separation measurement part may include a solid separation device; the solid separation device may communicate with the hydrate model; and the solid separation device may be further connected to a back-pressure control part and a gas/liquid separator, and the gas/liquid separator may be connected to an electronic scale.

The present disclosure also provides a consolidation and reconstruction simulation experiment evaluation method of a gas hydrate formation using the consolidation and reconstruction simulation experiment system of a gas hydrate formation described above, including the following steps:

S1: filling the cavity body with a material, and uniformly applying a layer of vaseline on the pre-embedded pipe; delivering a lifting liquid by the lifting pump from the lifting liquid injection port to the lifting channel, and allowing the lifting liquid to enter the lifting liquid space through the lifting channel, such that the pre-embedded pipe is lifted;

S2: after the pre-embedded pipe is lifted, delivering a consolidation liquid by the consolidation pump from the consolidation liquid injection port to the consolidation channel of the central oil pipe, and allowing the consolidation liquid to flow into the cavity body through the one-way valve to realize the cementing of the material in the cavity body;

S3: after the cementing is completed, delivering a fracturing liquid by the fracturing pump from the fracturing liquid injection port to the fracturing channel, and under the action of the sealing member, allowing the fracturing liquid to enter the cavity body through the perforations to realize the fracturing of the material in the cavity body; and S4: after the fracturing is completed, conducting a corresponding hydrate test through the measurement points.

Preferably, during a test process, a gas or a liquid may be injected into the cavity body through the gas injection part or the liquid injection part; and in S4, a temperature, a pressure, and a resistance may be measured at different positions of the hydrate, and corresponding ultrasonic probes may be used to measure hydrate intensities at different depths.

Compared with the prior art, the present disclosure has the following advantages:

(1) In view of the problems of sand production and formation collapse caused by hydrate decomposition during a hydrate formation development process, the theory of intra-layer reinforcement of hydrate formation fracturing grouting has been proposed for the first time, where during fracturing reconstruction, a consolidation liquid is injected into the fractures to form a reinforcement with a specified strength, which can effectively improve the stability of the formation and provide important guidance for the safe and efficient development of gas hydrates.

(2) The reinforcement shows prominent cementing performance to the surrounding formation, and after the hydrate is decomposed, the sand can be effectively prevented from falling off to avoid problems such as sand production.

(3) The reinforcement has excellent permeability, which can effectively avoid the circulation of a gas resulting from hydrate decomposition during a hydrate exploitation process.

(4) Hydrate formation fracturing and consolidation liquid injection are conducted at the same time, and after a specified pressure is maintained for a specified time according to the environmental conditions of the target formation, the consolidation liquid forms a reinforcement, which avoids secondary damage to the formation.

(5) In the consolidation and reconstruction simulation experiment system of a gas hydrate formation provided in the present disclosure, the pressure, temperature, gas-liquid ratio, and other conditions are simulated through laboratory conditions to study the generation and decomposition of a gas hydrate; the depressurization method, the heat injection method, and the chemical reagent injection method are used for exploitation to investigate a rational exploitation method of a gas hydrate; through strength (strain) tests and hydrate exploitation before and after the consolidation of the hydrate model, the influence of consolidation on the hydrate formation and the exploitation method is studied; through the gas injection and seepage pressure test module near a second interface, the gas channeling situation at the second cementation interface is tested; and cementing and fracturing experiments are simulated to study a reasonable exploitation method of a gas hydrate, which fundamentally solves the problem of cementing quality in deep-water weakly-cemented formations.

(6) In the consolidation and reconstruction simulation experiment system of a gas hydrate formation provided in the present disclosure, a three-layer pre-embedded pipe assembly is arranged and a consolidation liquid is injected through the central oil pipe to study strength (strain) tests and hydrate exploitation before and after consolidation of the hydrate formation, and to study the influence of consolidation on the hydrate formation and exploitation method. In addition, through the fracturing channel arranged, a fracturing liquid can be injected into the cavity body to conduct a fracturing experiment and explore a reasonable exploitation method of a gas hydrate.

(7) In the consolidation and reconstruction simulation experiment system of a gas hydrate formation provided by the present disclosure, a pressure, temperature, and saturation (resistance) acquisition system of an experimental device and processing software of a production separation measurement system are used to acquire model temperature, pressure, resistance, and other data in real time, and single-step file update and save and data save and backup are used to generate original data reports, analysis reports, graphs, 2D and 3D surfaces, and the like, and to generate a database file format, thereby facilitating flexible use by users.

REFERENCE NUMERALS

1 represents a pre-embedded pipe; 2 represents a casing pipe; 3 represents a central oil pipe; 4 represents an external pipe; 5 represents a fracturing liquid injection port; 6 represents a consolidation liquid injection port; 7 represents a lifting liquid injection port; 8 represents a vent; 9 represents a measurement point; 10 represents an upper flange; 11 represents a fluid interface; 12 represents a resistance test line interface; 13 represents a cavity body; 14 represents a core plug; 15 represents a lower flange; 16 represents a fluid channeling interface; 17 represents a sand settling area; 18 represents a water jacket; 19 represents a resistance test lead; 20 represents a consolidation liquid outlet; 21 represents a one-way valve; 22 represents a perforation; 23 represents a sealing member; 24 represents a sand filling layer; 25 represents an isolation ring; 26 represents a consolidation channel; 27 represents an area to be consolidated; 28 represents an ultrasonic probe; 29 represents a fluid outlet; 30 represents a fluid inlet; 31 represents a coarse filter; 32 represents a valve; 33 represents a circulating fluid pressure and temperature test interface; 34 represents a compaction plate; 35 represents a gas-liquid fluid and vent valve interface; 36 represents a double-action hydraulic cylinder; and 37 represents a hydraulic cylinder connecting flange.

DETAILED DESCRIPTION OF THE EMBODIMENTS

To make the objectives, technical solutions, and advantages of the present disclosure clearer, the present disclosure is further described in detail below with reference to specific implementations. It should be understood that the description is exemplary and is not intended to limit the scope of the present disclosure.

Example 1

A method for intra-layer reinforcement of a gas hydrate formation is provided, including the following steps:

(1) A gas hydrate formation sample was collected or temperature and pressure environmental parameters of a target formation were determined based on existing field data.

(2) Physical parameters of the target formation were analyzed, and a structure of a simulated formation was determined according to the physical parameters of the target formation; a hydrate saturation was controlled by means of quantified water and excess gas; under the temperature and pressure conditions of the target formation, the simulated formation was maintained; and physical parameters of the simulated formation were tested and compared with the physical parameters of the target formation, and experimental design parameters were adjusted until the physical parameters of the simulated formation were the same as or similar to the physical parameters of the target formation; where the physical parameters included, but were not limited to, density, porosity, permeability, particle size distribution, hydrate saturation, and original formation strength.

(3) A consolidation liquid system was allowed to be applied and solidified in the simulated formation by means of fracturing to form a reinforcement for the intra-layer reinforcement, where the reinforcement had reasonable permeability and strength; and (4) According to a required reinforcement range of the target formation and characteristics of the reinforcement, a fracturing grouting construction process was regulated until formation consolidation requirements were met, which included: grouting pipe string fracturing parameters and consolidation liquid injection parameters; where the reinforcement characteristics included a depth and a cross-sectional shape of a reinforcement, the number of reinforcements, and a strength of a reinforcement itself.

Step 3 further includes:

(3-1) A consolidation liquid system suitable for hydrate formation was analyzed. The consolidation liquid system is mainly composed of a material capable of hardening, an emulsion, a permeable microsphere, a penetration enhancer, and a rheology modifier, and has prominent fluidity and permeability characteristics, which is suitable for low-temperature and high-pressure deep-water shallow environments. A consolidation product itself has high permeability and strength, and shows prominent cementation characteristics to the surrounding formation.

(3-2) A consolidation liquid was used as a fracturing working liquid to conduct fracturing on the simulated formation. On the basis of the existing hydrate formation fracturing construction process, grouting pipe string fracturing parameters (fracturing shape and shape parameters thereof) and consolidation liquid injection parameters (injection pressure difference, injection flow rate, injection direction angle, and the like) were designed, the influencing rules of these parameters on the extension depth, width, and thickness of fracturing fractures were analyzed, and based on this, the above parameters were adjusted to meet the reinforcement range requirements of the hydrate formation.

Step 4 further includes:

(4-1) After the consolidation liquid was injected into the simulated formation, a specified pressure was maintained for a specified time according to the environmental conditions of the target formation, such that the consolidation liquid stayed in the fractures and was solidified to form a reinforcement. After the reinforcement was formed, the temperature and pressure were changed such that the hydrate was destabilized and decomposed, and soft soil falling off was collected and weighed to obtain a proportion of reinforcement-cemented soft soil, thereby analyzing the sand prevention effect of fracturing grouting formation reconstruction. The reinforcement shape and the fracture shape were compared, and the grouting pipe string fracturing parameters and injection parameters of fracturing grouting were adjusted to establish a control method for reinforcement characteristics.

(4-2) The consolidated simulated hydrate formation was subjected to compressive and shear strength tests to analyze the reinforcement effect, and the influence of the reinforcement shape and the reinforcement strength on the reinforcement effect was analyzed based on this to establish an intra-layer reinforcement and regulation method of a hydrate formation.

The intra-layer reinforcement of fracturing grouting improves the overall strength of the weakly-cemented hydrate formation, effectively supports the formation, and avoids formation collapse caused by hydrate decomposition during a development process. Moreover, the prominent cementation between the reinforcement and the formation and the network structure formed by reinforcements can effectively reduce the amount of soft soil falling off, avoid problems such as sand production, and provide an important guarantee for the safe and efficient hydrate development.

Example 2

A consolidation and reconstruction simulation experiment system for a gas hydrate formation is provided, including: a consolidation slurry pumping module, a hydrate annular core making module, a hydrate generation and decomposition real-time monitoring module, and an evacuation part for vacuuming.

Figure 1:
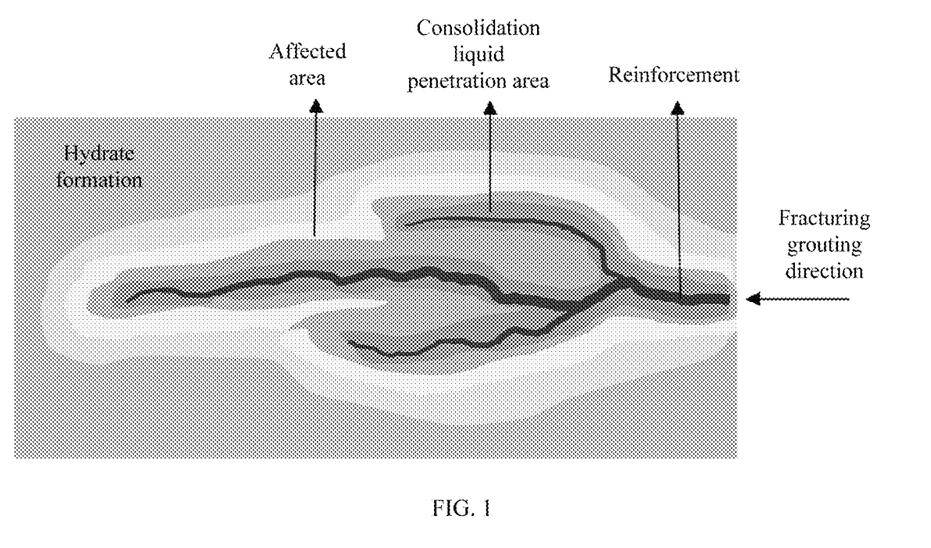
FIG. 1 is a schematic diagram of fracturing grouting intra-layer reinforcement of a hydrate formation according to the present disclosure.
Figure 2:
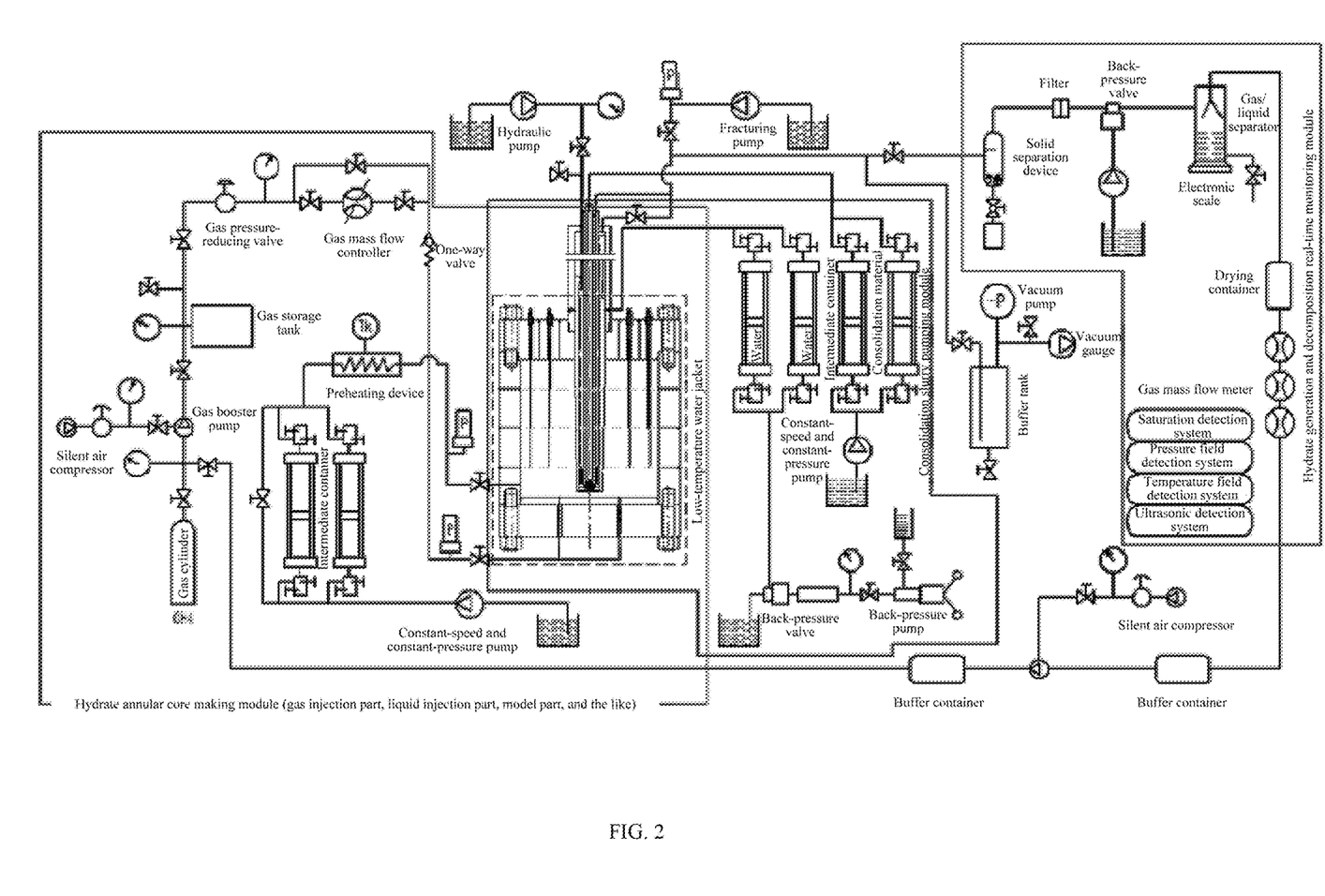
FIG. 2 is an overall schematic diagram of the consolidation and reconstruction simulation experiment system for a gas hydrate formation according to the present disclosure.
Figure 3:
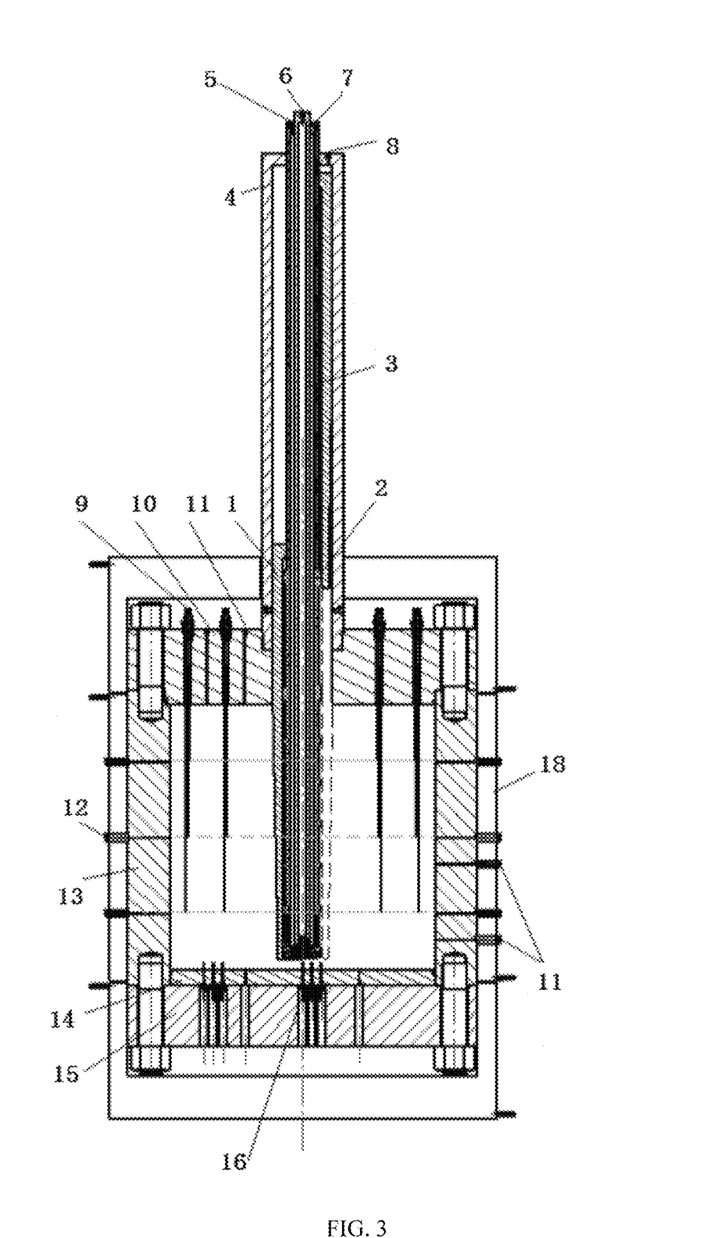
FIG. 3 is a front view of a hydrate model structure in the consolidation and reconstruction simulation experiment system for a gas hydrate formation according to the present disclosure.

The consolidation slurry pumping module includes a hydrate model; the hydrate model includes a cavity body 13, a plurality of fluid interfaces 11 are formed on the cavity body 13, and a plurality of measurement points 9 are further arranged on the cavity body 13; and a pre-embedded pipe assembly is connected in the cavity body 13, an end of the pre-embedded pipe assembly is arranged in the cavity body 13, and the pre-embedded pipe assembly includes a pre-embedded pipe 1, a casing pipe 2, and a central oil pipe 3 from outside to inside. A circulating fluid pressure and temperature test interface 33 and a gas-liquid fluid and vent valve interface 35 are formed on the cavity body 13.

An end of the pre-embedded pipe assembly protrudes into the cavity body 13, the pre-embedded pipe assembly includes a lifting liquid injection port 7, a consolidation liquid injection port 6, and a fracturing liquid injection port 5, and the lifting liquid injection port 7, the consolidation liquid injection port 6, and the fracturing liquid injection port 5 communicate with a lifting pump, a consolidation pump, and a fracturing pump, respectively.

The hydrate annular core making module includes a gas injection part and a liquid injection part; the gas injection part includes a high-pressure gas storage tank; one end of the high-pressure gas storage tank communicates with a gas cylinder through a gas booster pump, and the other end of the high-pressure gas storage tank communicates with the fluid interfaces 11 through a gas pressure-reducing valve and a gas mass flow controller; and the liquid injection part includes a constant-speed and constant-pressure pump, and a liquid communicates with the fluid interfaces 11 through the constant-speed and constant-pressure pump.

A gas injection system is mainly composed of a gas cylinder, a gas booster pump, a silent air compressor, a high-pressure gas storage tank, a gas pressure-reducing valve, a gas mass flow controller, a one-way valve 21, and the like.

The gas injection system is mainly intended to provide a gas source with a required pressure for the test device, and to control a gas flow rate at a model inlet and measure an instantaneous and cumulative amount of an injected gas.

The gas cylinder is a standard gas cylinder with a volume of about 40 L and a working pressure of no less than 16 MPa. About 4 gas cylinders are arranged.

The gas booster pump is a GB gas booster pump of SITEC, which is provided mainly for the pressurization of a carbon dioxide gas, a methane gas, and other gases. The gas booster pump has a model of GB 60, a pressurization ratio of 60:1, a maximum outlet pressure of 498 Bar, a minimum inlet pressure of 3.2 MPa, and a maximum displacement of 112 L/min. A low-pressure air source with a maximum output of 0.8 MPa is adopted as a power source of the gas booster pump.

The silent air compressor is arranged mainly to provide a power for the gas booster pump, provide a control air source for a constant-speed and constant-pressure pump, a back-pressure control pump, and the like, and achieve the cleaning and scavenging of a pipeline system. The silent air compressor is an oil-free/silent air compressor of the import brand PUMA. The air compressor adopts a fully-enclosed outer box, and uses the principle of air convection to achieve an automatic cooling effect, which is a full-automatic device, with simple operation, special coating treatment, beautiful appearance, and quiet and dustproof performance. A 288 L standard gas storage tank with a pressure resistance of 1 MPa is provided for storing a driving gas to avoid the frequent start-up of the air compressor.

A liquid injection system is mainly composed of an experimental liquid injection part (including a preheater), a consolidation liquid injection part, a pre-embedded pipe lifting injection part, a hydraulic fracturing pump, and the like.

A constant-speed and constant-pressure pump is adopted as a power source of the liquid injection system, and a high-pressure-resistant piston intermediate container is adopted as a fluid storage container. A main function of the liquid injection system is to provide the test device with a liquid required for test. The constant-speed and constant-pressure pump injects a liquid according to the injection pressure and rate set by a test, and instantaneous and cumulative amounts are measured. A fluid required by the test is placed in the piston container; and the preheater is mainly used for constant temperature control of the injected fluid.

The TC-100D high-pressure constant-speed and constant-pressure pump (double-cylinder type) is adopted, and a digital positioning monitoring servo control circuit is adopted, such that a solution can flow accurately under any pressure conditions, and a high-speed flow is smooth. The flow control range is as follows: flow rate: 0.001/min to 30/min; flow accuracy: 0.001 ml/min, and pressure: 0 MPa to 70 MPa.

The hydrate generation and decomposition real-time monitoring module includes an outlet separation measurement part and a test part; and the outlet separation measurement part communicates with the hydrate model, and the test part communicates with the measurement points 9.

The preheater adopts a spiral tube structure and an electric heating furnace structure, with an outer diameter of φ6 mm, a wall thickness of 1 mm, 1 set of 316 L materials, a length of 6 m, a pressure resistance of 40 MPa, and a maximum working temperature of 200° C.

The evacuation part for vacuuming communicates with the hydrate model. The evacuation part is provided mainly to evacuate the model inlet and outlet parts and discharge a gas.

Figure 9:
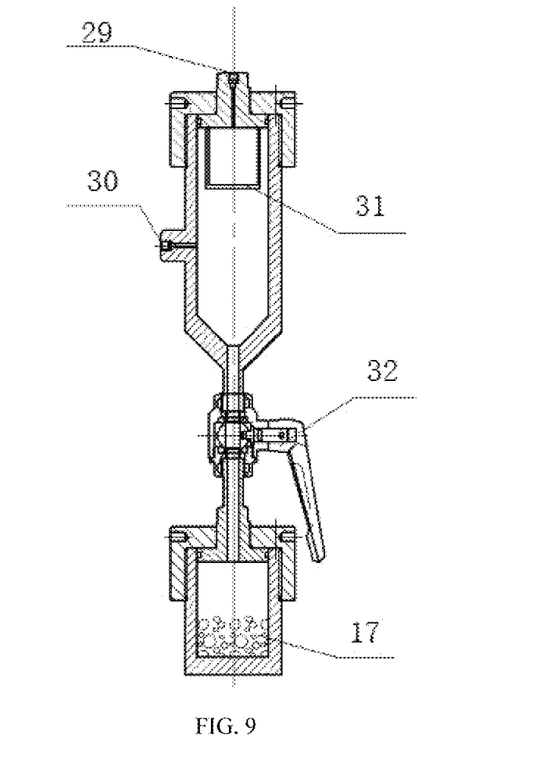
FIG. 9 is a schematic structural diagram of a solid separation device in the consolidation and reconstruction simulation experiment system for a gas hydrate formation according to the present disclosure.

The outlet separation measurement part may include a solid separation device; the solid separation device may communicate with the hydrate model; and the solid separation device may be further connected to a back-pressure control part and a gas/liquid separator, and the gas/liquid separator may be connected to an electronic scale. The outlet separation measurement part is mainly composed of a solid separation device, a back-pressure control part, a gas/liquid separator, and an electronic scale. The solid separation device includes a fluid outlet 29 and a fluid inlet 30, a coarse filter 31 and a sand settling area 17 are arranged in the solid separation device, and the solid separation device is further connected to a valve 32.

The main function of the outlet separation measurement part is to separate and measure an extracted natural gas and water and a solid sediment carried thereby. A solid sediment is separated from a gas or a liquid by sedimentation and filtration, and a collected solid sediment is dried and then measured by an electronic scale. The gas/liquid separation is achieved due to different densities and gravities, a separated liquid is collected at a lower part and measured by an electronic scale in real time, and a separated gas is dried and measured by a gas mass flow meter.

The solid separation device is provided mainly for the solid separation at a model production outlet, and a filter screen is arranged at an internal outlet, which is removable up and down and is made of 316 L stainless-steel. The sand and gravel produced are settled and collected mainly by means of sedimentation and filtration, then dried, and measured by an electronic scale.

The back-pressure control part is provided mainly for the pressure control at the model outlet and the accurate control of depressurization development. The back-pressure control part is mainly composed of a back-pressure valve and a back-pressure control pump.

The back-pressure valve has a pressure resistance of 50 MPa and is made of 316 L stainless-steel. The back-pressure valve adopts a sheet-type structure, mainly composed of a stainless-steel sheet, a valve needle, a valve seat, upper and lower valve bodies, and a sealing ring. The valve has the advantages of high adjustment sensitivity, high pressure resistance, high control accuracy, and light weight.

The main function of the gas/liquid separator is to achieve gas/liquid separation of a gas-liquid fluid at an outlet of the model part, where the fluid is subjected to umbrella spiral separation, a gas is measured by a gas measurement device through the upper outlet, and a liquid flows out from a bottom and is collected by a measuring cylinder. The gas-liquid fluid enters from a side of a top separator, and then is subjected to separation by an umbrella-shaped separator, such that, under the action of gravity, a liquid settles to the bottom, and is collected in a closed container and measure by an electronic scale in real time; and a gas flows out through a top outlet and is measured by a wet gas flow meter.

The gas recovery part is mainly composed of a low-pressure gas pressurization part and the like.

The main function of the gas recovery part is to recover the produced gas or the residual gas inside the model after the test is completed (the gas is pressurized by the low-pressure pressurization part and the high-pressure pressurization part of the gas injection part, and then stored in a high-pressure storage tank).

A data acquisition and processing system is also included, which is composed of an analog-signal data acquisition module, a computer, data acquisition control software, and the like.

Figure 10:
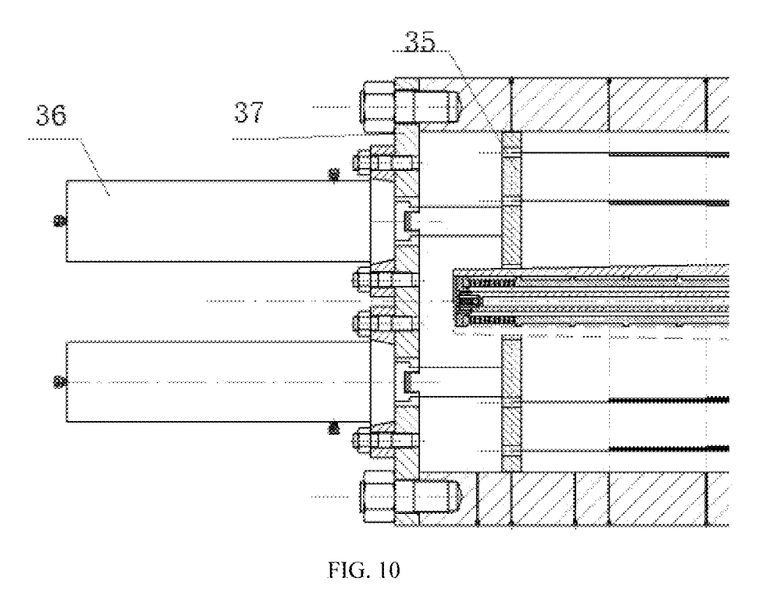
FIG. 10 is a schematic diagram of a partial structure of a double-action hydraulic cylinder in the consolidation and reconstruction simulation experiment system for a gas hydrate formation according to the present disclosure.

An auxiliary component is also included. The auxiliary component includes a double-action hydraulic cylinder 36. The double-action hydraulic cylinder 36 is connected to the cavity body 13 through a hydraulic cylinder connecting flange 37. The double-action hydraulic cylinder 36 is connected to a compaction plate 34, and the compaction plate 34 is arranged in the cavity body 13. Hydraulic compaction: In order to ensure the experimental repeatability, it is necessary to keep the same compaction pressure for each filled sample. A hydraulic pressure of a hydraulic cylinder is first used for loading. An electric hydraulic station is adopted, which is controlled by a solenoid directional control valve; and a loading pressure is set and controlled by an electric contact pressure gauge.

A plurality of fluid interfaces 11 are formed on the cavity body 13, and a plurality of measurement points 9 are also arranged on the cavity body 13.

An end of the pre-embedded pipe assembly is arranged in the cavity body 13, the pre-embedded pipe assembly includes a pre-embedded pipe 1, a casing pipe 2, and a central oil pipe 3 from outside to inside, and an end of the pre-embedded pipe 1 protrudes into the cavity body 13.

The casing pipe 2 is arranged in the pre-embedded pipe 1, and a lifting channel is formed on a pipe wall of the casing pipe 2; and one end of the lifting channel penetrates through the pipe wall of the casing pipe 2 to form a lifting liquid space with a top of the pre-embedded pipe 1, and a lifting liquid injection port 7 is formed at the other end of the lifting channel.

The central oil pipe 3 is arranged in the casing pipe 2, and a consolidation channel 26 is formed in the central oil pipe 3; one end of the consolidation channel 26 is arranged in the cavity body 13, and a one-way valve 21 is arranged inside the consolidation channel 26; and the other end of the consolidation channel 26 penetrates through the cavity body 13, and the consolidation liquid injection port 6 is formed on the end.

Figure 5:
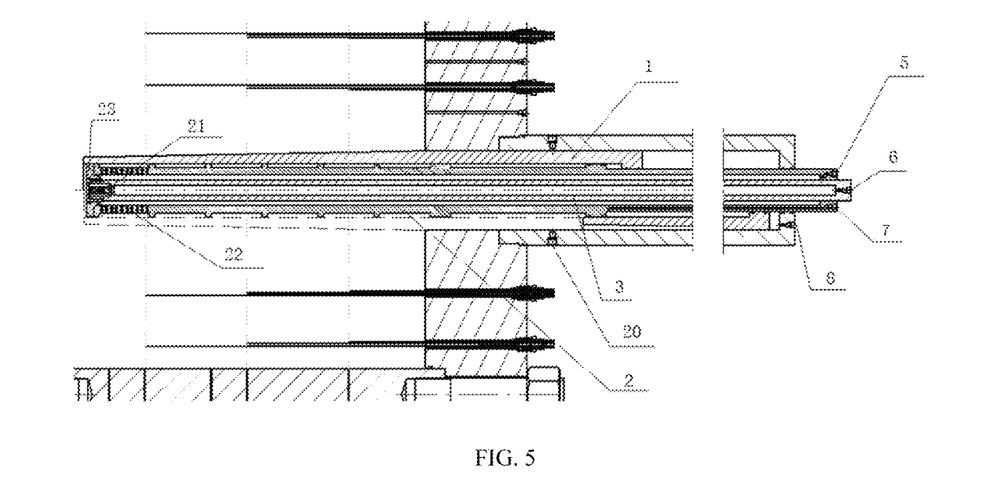
FIG. 5 is an enlarged view of a partial structure of the casing pipe in FIG. 3.

A fracturing channel is formed between the central oil pipe 3 and the casing pipe 2; one end of the fracturing channel is arranged in the cavity body 13 and is connected to a sealing member 23, and a plurality of perforations 22 are formed on an end of the casing pipe 2 close to the sealing member 23; and the other end of the fracturing channel penetrates through the cavity body 13, and the fracturing liquid injection port 5 is formed on the end.

The cavity body 13 has an inner diameter of φ700 mm, an inner height of 700 mm, and a maximum working fracturing pressure of 30 MPa, is made of 316 L stainless-steel, and has an overall design for water-bath temperature control.

During arrangement, two pre-embedded pipe 1 arrangement positions are reserved at a center and an edge of the cavity body 13, and a top of the pre-embedded pipe 1 has a size of about φ110 mm.

A film for sealing is arranged outside the perforations 22. The perforations 22 are designed as replaceable components (the casing pipe is designed as upper and lower threaded connectors), which is convenient for simulating the perforation 22 fracturing at different positions.

The sealing member 23 is a packer. The sealing member 23 is arranged in the fracturing channel between the central oil pipe 3 and the casing pipe 2. Under the action of the sealing member 23, a fracturing liquid can flow into the cavity body 13 through the perforations 22 to realize a simulated fracturing work, which is more practical.

The cavity body 13 is also fixedly connected to an external pipe 4, the external pipe 4 is arranged outside the pre-embedded pipe 1, the external pipe 4 is slidably connected to the pre-embedded pipe 1, and a vent 8 is formed at a side of the external pipe 4.

The cavity body 13 communicates with a gas pressure-reducing valve for controlling a gas pressure; the cavity body 13 communicates with a constant-speed and constant-pressure pump for controlling a liquid pressure; and the cavity body 13 further communicates with a water bath for controlling a temperature. A consolidation liquid outlet 20 and a vent 8 are further formed on the cavity body 13. The vent 8 plays a role of pressure release. A part of the pressure needs to be released, such that the pre-embedded pipe 1 can be drawn out. After the experiment is completed, the pressure is released, and then the lifting liquid can also be discharged from the injection port.

In the present disclosure, the temperature control is realized by a constant-temperature water bath, and a circulating liquid of a refrigeration unit is adopted for cooling and keeping a constant temperature. The main function of controlling the temperature is to provide a temperature environment required by the test for the model part.

A water jacket 18 is also arranged outside the cavity body 13. The model is cooled by an external water jacket 18. An external thermal insulation layer and the upper and lower covers are designed as a built-in jacket layer+external thermal insulation layer structure, which ensures that the model is in a constant-temperature environment, and each probe and interface are led out of the water jacket 18 through connecting wires.

Moreover, a low-temperature bath is provided with a circulating water pump, which makes a temperature in the constant-temperature water bath more stable. The low-temperature bath has low-liquid-level protection, over-temperature protection, temperature sensor abnormality protection system, power-off protection, and other measures to ensure the safe operation of instruments and devices.

The low-temperature bath adopts a large-screen liquid crystal display, software program control, and editable time/temperature curves. Multi-stage programmable temperature and time programs can be adopted to control constant-temperature and cooling processes, and a cooling speed can be automatically controlled according to user requirements. Up to 30 temperature/time periods can be programmed and stored, and each program can be set to run for 0 min to 9,999 min. A variety of parameter setting methods can be adopted: convenient and quick input keys and shift keys, increasing and decreasing keys, and setting temperature/time periods and other advanced control parameters or directly recalling the stored temperature/time setting programs.

Figure 8:
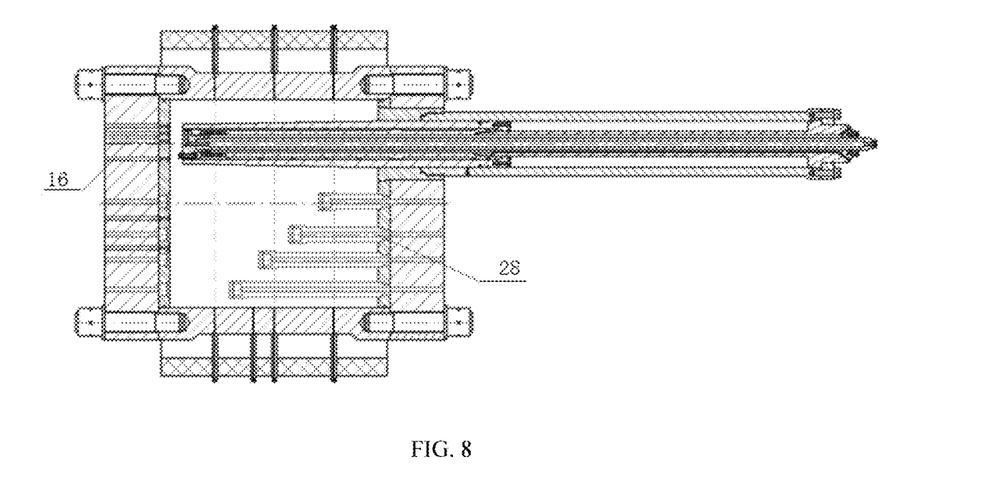
FIG. 8 is a schematic diagram of an ultrasonic probe distribution in the consolidation and reconstruction simulation experiment system for a gas hydrate formation according to the present disclosure.

The cavity body 13 is further connected to a plurality of resistance measurement layers, each resistance measurement layer includes a plurality of resistance measurement points, and each resistance measurement layer is arranged annularly inside the cavity body 13; a resistance test line interface 12 communicating with resistance measurement points is formed on the cavity body 13, and the resistance test line interface 12 is connected to a resistance test lead 19; and the cavity body 13 is further connected to a plurality of ultrasonic probes 28, and the ultrasonic probes 28 penetrate into the cavity body 13 at different depths.

Figure 4:
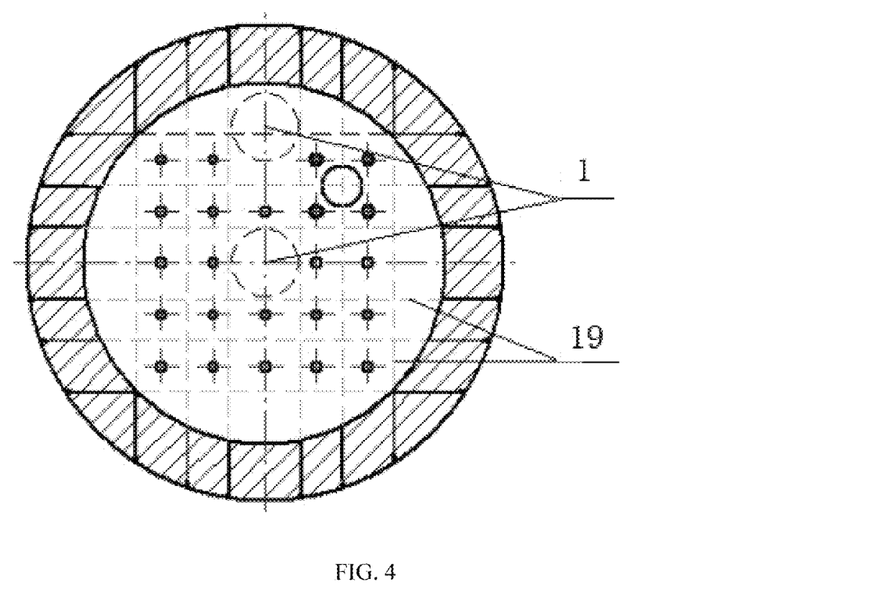
FIG. 4 is side view of a hydrate model in the consolidation and reconstruction simulation experiment system for a gas hydrate formation according to the present disclosure.

Two ends of the cavity body 13 are provided with a lower flange 15 and an upper flange 10, respectively, and the lower flange 15 and the upper flange 10 constitute a flange, where the upper flange 10 is provided to relatively fix the ultrasonic probe 28. The flange cooperates with a core plug 14 to form a closed space in the cavity body 13. The cavity body 13 also communicates with fluid channeling interfaces 16, and 6 fluid channeling interfaces 16 are arranged in total.

Figure 7:
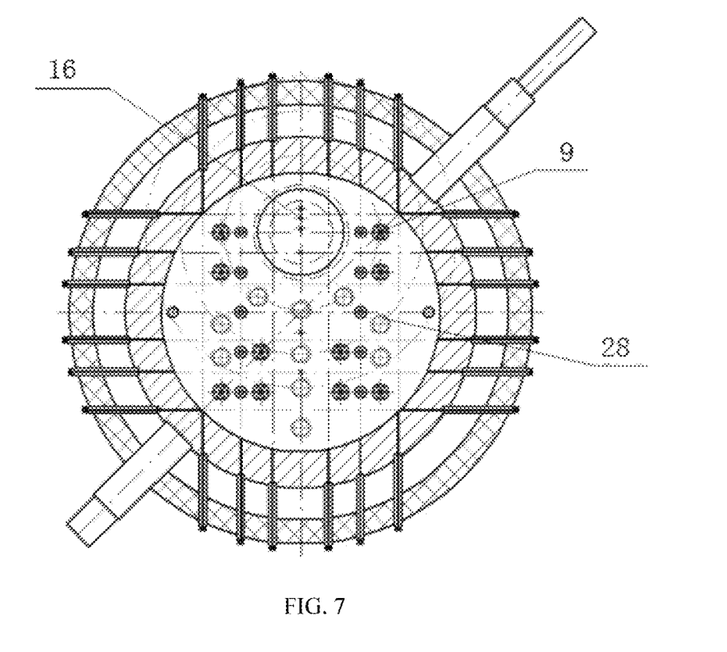
FIG. 7 is a schematic diagram of a measurement point distribution in the consolidation and reconstruction simulation experiment system for a gas hydrate formation according to the present disclosure.

The measurement points 9 include a plurality of pressure measurement layers and a plurality of temperature measurement layers, and each pressure measurement layer and each temperature measurement layer respectively include a plurality of pressure measurement points and a plurality of temperature measurement points.

The pressure measurement layers, the temperature measurement layers, and the resistance measurement layers are axially arranged into three layers, which have distances of 150 mm, 350 mm, and 550 mm from the bottom, respectively. 32 resistance measurements are arranged on each layer at an interval of 100 mm to 120 mm. Temperature measurement points and pressure measurement points are arranged in a way where a plurality of measurement points 9 are arranged at the same position, which reduces the number of interfaces and lowers the risk of leakage.

A resistance test component is arranged inside the resistance measurement point, and the grid-like arrangement is adopted to reduce the influence of wiring on a fluid inside the model.

23 temperature measurement points and pressure measurement points are arranged on each layer at an interval of 100 mm, and there are 69 pressure measurement points and temperature measurement points in total, with an inter-layer distance of 200 mm. 3 pressure sensor connection pipelines are arranged at each pressure measurement point, and whether to arrange a pressure test pipeline is determined according to needs. 3 temperature sensors are arranged at each temperature measurement point.

The ultrasonic probes 28 are PS wave probes with a design diameter of 30 mm, and the pre-embedded pipe 1 method is used to arrange the ultrasonic probes at different depths. A total of 10 pairs of ultrasonic probes are arranged in the arrangement mode of 3+3+3+1, with a spacing of 100 mm.

Figure 6:
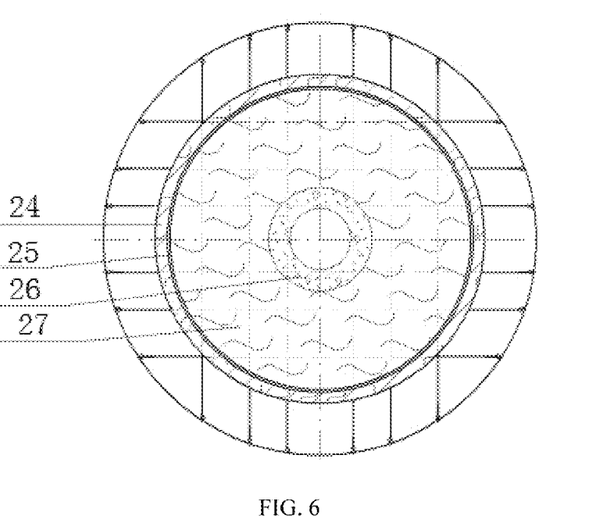
FIG. 6 is a schematic structural diagram of an isolation ring in the consolidation and reconstruction simulation experiment system for a gas hydrate formation according to the present disclosure.

The hydrate model provided by the present disclosure has a consolidation isolation protection design inside. In order to prevent a consolidated product from sticking to an inner wall of a cylinder at the end of a sample consolidation experiment (which makes sampling difficult), a special isolation ring 25 is specially designed.

The isolation ring 25 is also arranged in the cavity body 13, a sand filling layer 24 is arranged between the inner wall of the cavity body 13 and an outer wall of the isolation ring 25, and an area 27 to be consolidated is arranged between an inner wall of the isolation ring 25 and the outer wall of the consolidation channel 26.

Example 3

A consolidation and reconstruction simulation experiment evaluation method of a gas hydrate formation using the consolidation and reconstruction simulation experiment system of a gas hydrate formation described in Example 2 is provided, including the following steps:

S1: The cavity body 13 was filled with a material, and a layer of vaseline was uniformly applied on the pre-embedded pipe 1; and a lifting liquid was delivered from the lifting liquid injection port 7 to the lifting channel, and allowed to enter the lifting liquid space through the lifting channel, such that the pre-embedded pipe 1 was lifted.

S2: After the pre-embedded pipe 1 was lifted, a consolidation liquid was delivered from the consolidation liquid injection port 6 to the consolidation channel 26 of the central oil pipe 3, and allowed to flow into the cavity body 13 through the one-way valve 21 to realize the cementing of the material in the cavity body 13.

S3: After the cementing was completed, a fracturing liquid was delivered from the fracturing liquid injection port 5 to the fracturing channel, and under the action of the sealing member 23, the fracturing liquid entered the cavity body 13 through the perforations 22 to realize the fracturing of the material in the cavity body 13.

S4: After the fracturing was completed, a corresponding hydrate test was conducted through the measurement points 9.

In S4, a temperature, a pressure, and a resistance were measured at different positions of the hydrate, and corresponding ultrasonic probes 28 were used to measure hydrate intensities at different depths.

It should be noted that, in the laboratory, the pre-embedded pipe 1, the casing pipe, and the central oil pipe 3 were arranged in proper places first; then a specified mass of quartz sand was mixed with a specified mass of water, and then a reactor body of the hydrate model was inverted and filled with sand; and the casing pipe 2 needed to be perforated at a fracturing position, and the perforations 22 were sealed from the outside with a film (heat-shrinkable tube, tape, and the like) during arrangement.

In addition, under the action of the sealing member 23, the formation was fractured through the simulated perforations 22; and after the fracturing was completed, a hydrate exploitation experiment was conducted through the fractures and perforations 22, and the strength was tested through the ultrasonic probes 28 at different depths.

Example 4

According to the methods in Example 3, transducers with sound wave frequencies of 60 KHz, 400 KHz, 500 KHz, 750 KHz, and 1,000 KHz were used to conduct ultrasonic testing on cores of the experimental groups, and an association relationship between the sound wave frequency and the sound wave velocity was established.

Example 5

According to the methods in Example 3, a core with a height of 500 mm was fabricated; and after the first test, 100 mm was cut off, and the remaining part was tested, such that a core with a specified height gradient was formed and an association relationship between the sound wave velocity and the sample length was established.

Example 6

Cenospheres at different contents were added to the weakly-cemented gas hydrate reservoir to make simulated cores with different densities. According to the test method in Example 3, an association relationship between the sound wave velocity and the formation density was established.

What is claimed is:

1. A consolidation and reconstruction simulation experiment system for consolidating and reconstructing a gas hydrate formation, comprising:
   a consolidation slurry pumping module, wherein the consolidation slurry pumping module comprises a hydrate model; the hydrate model comprises a cavity body, a plurality of fluid interfaces are formed on the cavity body, and a plurality of measurement points are further arranged on the cavity body; and a pre-embedded pipe assembly is connected in the cavity body, an end of the pre-embedded pipe assembly is arranged in the cavity body, and the pre-embedded pipe assembly comprises a pre-embedded pipe, a casing pipe, and a central oil pipe from the outside to inside of the pre-embedded pipe assembly; and
   the end of the pre-embedded pipe assembly protrudes into the cavity body, and the pre-embedded pipe assembly comprises a lifting liquid injection port, a consolidation liquid injection port, and a fracturing liquid injection port; and the lifting liquid injection port, the consolidation liquid injection port, and the fracturing liquid injection port communicate with a lifting pump, a consolidation pump, and a fracturing pump, respectively;
   a hydrate annular core making module, wherein the hydrate annular core making module comprises a gas injection part and a liquid injection part; the gas injection part comprises a high-pressure gas storage tank; a first end of the high-pressure gas storage tank communicates with a gas cylinder through a gas booster pump, and a second end of the high-pressure gas storage tank communicates with the fluid interfaces through a gas pressure-reducing valve and a gas mass flow controller; and the liquid injection part comprises a constant-speed and constant-pressure pump, and a liquid communicates with the fluid interfaces through the constant-speed and constant-pressure pump;

a hydrate generation and decomposition real-time monitoring module, wherein the hydrate generation and decomposition real-time monitoring module comprises an outlet separation measurement part and a test part; and the outlet separation measurement part communicates with the hydrate model, and the test part communicates with the measurement points; and an evacuation part for vacuuming, wherein the evacuation part communicates with the hydrate model;

wherein the consolidation slurry pumping module is connected to the hydrate annular core making module via the hydrate model; and the hydrate model of the consolidation slurry pumping module communicates with the outlet separation measurement part of the hydrate generation and decomposition real-time monitoring module via a line;

wherein the consolidation and reconstruction simulation experiment system is configured to perform a simulation experiment method as follows:

S1: filling the cavity body with a material, and uniformly applying a layer of petroleum jelly on the pre-embedded pipe; delivering a lifting liquid by the lifting pump from the lifting liquid injection port to the lifting channel, and allowing the lifting liquid to enter the lifting liquid space through the lifting channel, such that the pre-embedded pipe is lifted;

S2: after the pre-embedded pipe is lifted, delivering a consolidation liquid by the consolidation pump from the consolidation liquid injection port to the consolidation channel of the central oil pipe, and allowing the consolidation liquid to flow into the cavity body through the one-way valve to realize the cementing of the material in the cavity body;

S3: after the cementing is completed, delivering a fracturing liquid by the fracturing pump from the fracturing liquid injection port to the fracturing channel, and under an action of the sealing member, allowing the fracturing liquid to enter the cavity body through the perforations to realize the fracturing of the material in the cavity body; and S4: after the fracturing is completed, conducting a corresponding hydrate test through the measurement points.

2. The consolidation and reconstruction simulation experiment system according to claim 1, wherein the casing pipe is arranged in the pre-embedded pipe, and a lifting channel is formed on a pipe wall of the casing pipe; a first end of the lifting channel penetrates through the pipe wall of the casing pipe to form a lifting liquid space with a top of the pre-embedded pipe, and the lifting liquid injection port is formed at a second end of the lifting channel;

the central oil pipe is arranged in the casing pipe, and a consolidation channel is formed in the central oil pipe; a first end of the consolidation channel is arranged in the cavity body, and a one-way valve is arranged inside the consolidation channel; and a second end of the consolidation channel penetrates through the cavity body, and is provided with the consolidation liquid injection port; and a fracturing channel is formed between the central oil pipe and the casing pipe; a first end of the fracturing channel is arranged in the cavity body and is connected to a sealing member, and a plurality of perforations are formed on an end of the casing pipe close to the sealing member; and a second end of the fracturing channel penetrates through the cavity body, and is provided with the fracturing liquid injection port.

3. The consolidation and reconstruction simulation experiment system according to claim 2, wherein a film for sealing is provided outside the perforations, and the sealing member is a packer.

4. The consolidation and reconstruction simulation experiment system according to claim 1, wherein the cavity body is further fixedly connected to an external pipe, and the external pipe is arranged outside the pre-embedded pipe; and the external pipe is slidably connected to the pre-embedded pipe, and a vent is formed at a side of the external pipe.

5. The consolidation and reconstruction simulation experiment system according to claim 1, wherein the cavity body communicates with a gas pressure-reducing valve for controlling a gas pressure; the cavity body communicates with a constant-speed and constant-pressure pump for controlling a liquid pressure; and the cavity body further communicates with a water bath for controlling a temperature.

6. The consolidation and reconstruction simulation experiment system according to claim 1, wherein the cavity body is further connected to a plurality of resistance measurement layers, each resistance measurement layer comprises a plurality of resistance measurement points, and each resistance measurement layer is arranged annularly inside the cavity body; a resistance test line interface communicating with the resistance measurement points is formed on the cavity body; and the cavity body is further connected to a plurality of ultrasonic probes, and the ultrasonic probes protrudes into the cavity body at different depths.

7. The consolidation and reconstruction simulation experiment system according to claim 1, wherein the measurement points comprise a plurality of pressure measurement layers and a plurality of temperature measurement layers, and each pressure measurement layer and each temperature measurement layer respectively comprise a plurality of pressure measurement points and a plurality of temperature measurement points.

8. The consolidation and reconstruction simulation experiment system according to claim 1, wherein the outlet separation measurement part comprises a solid separation device; the solid separation device communicates with the hydrate model; and the solid separation device is further connected to a back-pressure control part and a gas/liquid separator, and the gas/liquid separator is connected to an electronic scale.

9. A consolidation and reconstruction simulation experiment evaluation method of a gas hydrate formation, using the consolidation and reconstruction simulation experiment system according to claim 2, comprising the following steps:

S1: filling the cavity body with a material; and uniformly applying a layer of petroleum jelly on the pre-embedded pipe; delivering a lifting liquid by the lifting pump from the lifting liquid injection port to the lifting channel, and allowing the lifting liquid to enter the lifting liquid space through the lifting channel, such that the pre-embedded pipe is lifted;

S2: after the pre-embedded pipe is lifted, delivering a consolidation liquid by the consolidation pump from the consolidation liquid injection port to the consolidation channel of the central oil pipe, and allowing the consolidation liquid to flow into the cavity body through the one-way valve to realize the cementing of the material in the cavity body;

S3: after the cementing is completed, delivering a fracturing liquid by the fracturing pump from the fracturing liquid injection port to the fracturing channel, and under an action of the sealing member, allowing the fracturing liquid to enter the cavity body through the perforations to realize the fracturing of the material in the cavity body; and S4: after the fracturing is completed, conducting a corresponding hydrate test through the measurement points.

10. The consolidation and reconstruction simulation experiment evaluation method according to claim 9, wherein during a test process, a gas or a liquid is injected into the cavity body through the gas injection part or the liquid injection part; and in S4, a temperature, a pressure, and a resistance are measured at different positions of the hydrate, and corresponding ultrasonic probes are used to measure hydrate intensities at different depths.

11. The consolidation and reconstruction simulation experiment evaluation method according to claim 9, wherein a film for sealing is provided outside the perforations, and the sealing member is a packer.

12. The consolidation and reconstruction simulation experiment evaluation method according to claim 9, wherein the cavity body is further fixedly connected to an external pipe, and the external pipe is arranged outside the pre-embedded pipe, and the external pipe is slidably connected to the pre-embedded pipe, and a vent is formed at a side of the external pipe.

13. The consolidation and reconstruction simulation experiment evaluation method according to claim 9, wherein the cavity body communicates with a gas pressure-reducing valve for controlling a gas pressure, the cavity body communicates with a constant-speed and constant-pressure pump for controlling a liquid pressure, and the cavity body further communicates with a water bath for controlling a temperature.

* * * * *